United States Patent [19]

Liserre

[11] Patent Number: 5,653,366
[45] Date of Patent: Aug. 5, 1997

[54] LOCKING STORAGE CONTAINER

[76] Inventor: Tony Liserre, 1356 Hiahia St., Wailuku, Hi. 96793

[21] Appl. No.: 572,179

[22] Filed: Dec. 13, 1995

[51] Int. Cl.$^6$ .............. B60R 7/00; B60R 9/00; B60R 11/00
[52] U.S. Cl. .......... 224/539; 224/436; 224/431; 224/433; 224/315; 220/481; 280/769; 248/550; 248/551; 312/351.1
[58] Field of Search .................. 224/430, 431, 224/433, 539, 309, 315, 319, 329, 330; 220/1.5, 477, 481; 280/769; 410/82, 83, 90; 248/550, 551; 312/220, 351.1, 902, 247; 292/202

[56] References Cited

U.S. PATENT DOCUMENTS

| | | | |
|---|---|---|---|
| 3,334,953 | 8/1967 | Becker | 312/351.1 |
| 4,249,684 | 2/1981 | Miller et al. | |
| 4,938,398 | 7/1990 | Hallsen | |
| 4,993,771 | 2/1991 | Ingerson et al. | |
| 5,255,832 | 10/1993 | Christensen | |
| 5,395,019 | 3/1995 | Christensen | |

Primary Examiner—Henry J. Recla
Assistant Examiner—Timothy J. Maust
Attorney, Agent, or Firm—Laff, Whitesel, Conte & Saret, Ltd.

[57] ABSTRACT

A safety box is adapted for use at any suitable location; however, it is designed especially for use in an automotive vehicle, and more specifically in a rented auto. An anchor member (perhaps a massive nylon block) is bolted to the floor of the vehicle or to another suitable stationary structure. The bottom of the box has a cavity which slips over and captures the anchor member, thus securing the box to the automotive vehicle floor or the like. A sliding door panel is located on the top of the box. In the back of the box, a sliding latch bar is completely enclosed within a vertical bore through the box wall. A spring biases the latch bar to a raised position where its lower end is outside the cavity. A closing of the lid pushes the latch bar downwardly and into the cavity, which traps the anchor member within the cavity to prevent a theft of the box. The closed lid, and therefore the trapped anchor member, is locked with a single key.

16 Claims, 2 Drawing Sheets

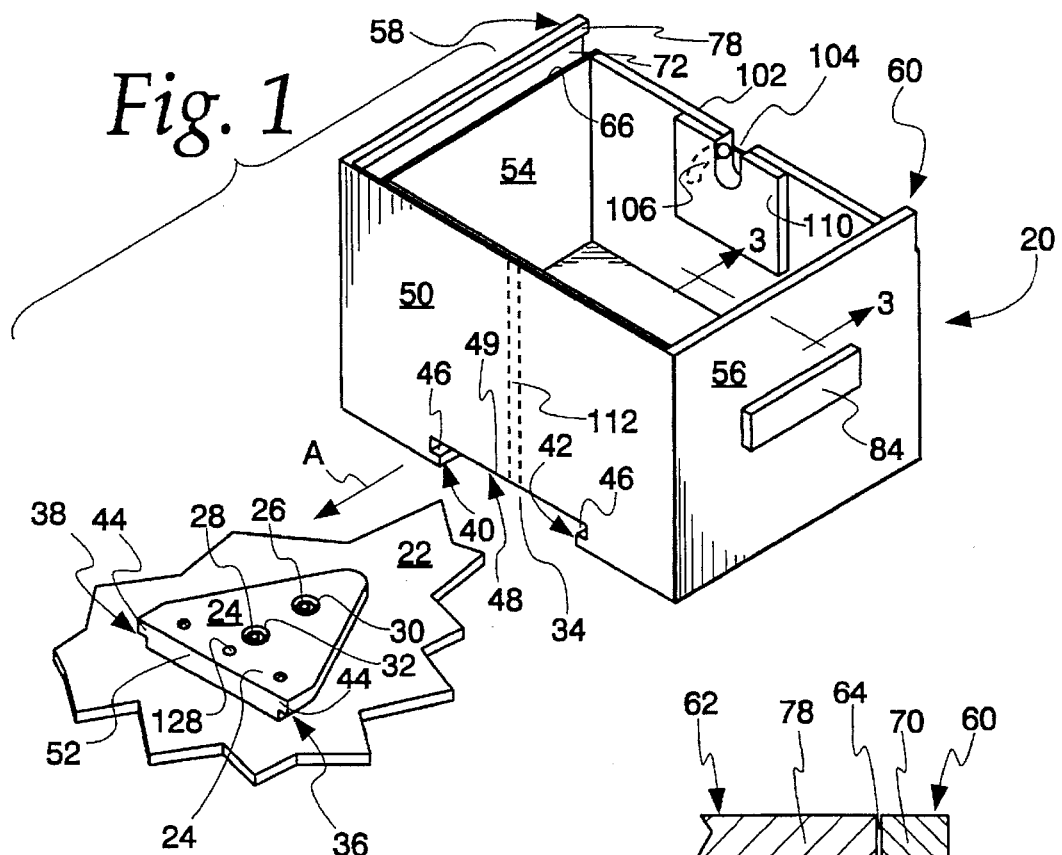
*Fig. 1*
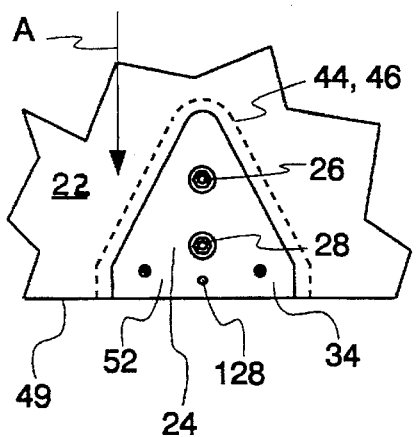
*Fig. 1a*
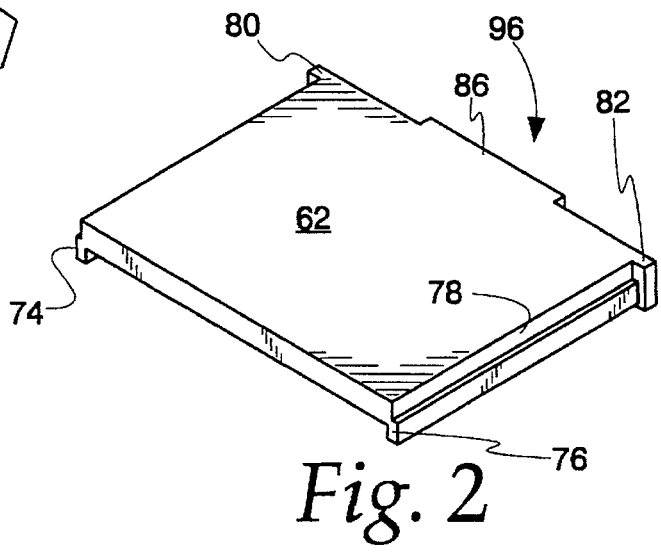
*Fig. 3*
*Fig. 2*

LOCKING STORAGE CONTAINER

This invention relates to locking storage containers and more particularly to security boxes which may be taken from place to place and then locked in position to a secure structure when left unattended.

Locking storage containers of the described type may find use in many different environments. For example, it would be desirable for a rented car to have an anchor member mounted on and secured to the floor of a trunk. The renter may then have a security box which attaches and locks to the anchor member, at the turn of a single key. If the renter leaves his car with the security box in the trunk, it cannot be removed with any reasonable effort which may be performed by a thief breaking into the trunk under an expected time constraint.

If the car is parked in a location when a thief has a substantial amount of time and privacy to undertake a greater effort or to use violent force, it is desirable for the renter to quickly and easily remove the security box from its anchor member and to take it with him. This means that it must be easy to remove the box from and reinstall it on the anchor member. Moreover, the means for mounting and removing the security box should be locked within the box itself so that the turn of a single key both locks or unlocks the box and traps or releases the box on or from the anchor member.

One prior art box of the described type is seen in U.S. Pat. No. 5,395,019. However, to anchor this box, internal latches require a very large amount of space within the box. Also, the internal latches are in the way if someone wants to place objects in the box, especially if the objects are large enough to fit into and occupy most of the space behind the latches. Another box is shown in U.S. Pat. No. 4,249,684. However, this patent depends for anchoring upon swinging lever arms which may bind against bulky objects which touch or press up against the end walls of the box. Both of these patents require a number of extra steps beyond simply locking the box with a single key. In some situations, it is possible that such extra steps could actually introduce a window of opportunity for a thief lurking in the background.

Other U.S. patents which show background art are 3,727,971; 3,826,529; 4,170,324; 4,190,281; 4,522,326; 4,531,774; 4,564,167; 4,573,731; and 4,752,095. It is thought that none of these other patents is directly in point with the present invention.

Accordingly, an object of this invention is to provide new and improved means for and methods of quickly and easily locking a security box to and removing the box from an anchor member attached to a secure structure, at the turn of a single key. Here, an object is to provide a security box especially for use in rented cars, trucks, or other automotive vehicles. However, an object is also to provide a general purpose security box which may find use whenever such a box is necessary or desirable, as in hotel rooms, offices, or the like.

In keeping with an aspect of the invention, those and other objects are accomplished by providing an anchoring member which is bolted in place, as on the floor of an automobile trunk, or another secure structure, for example. The anchor member is captured and trapped in a cavity on the underside of the security box so that the bolts holding the anchor member cannot be removed while the box is locked in place over the anchor member. The capture of an anchor member within the cavity is accomplished automatically by closing and locking a door on the box. The capture of the anchor member is released when the door is opened. When the closed door is locked every reasonably expected way of breaking into or stealing the box is barred. For example, the edges of the door are formed in a very strong manner which tends to prevent prying open the door on the box. Still, the box may be either anchored or released at the closing or opening of a door and the turn of a single key.

A preferred embodiment of this invention is shown in the attached drawings in which:

FIG. 1 is a perspective view of the inventive box and an anchor member associated therewith;

FIG. 1a schematically shows an arrowhead shaped anchor member captured within a complimentarily shaped cavity or opening in the bottom of the box;

FIG. 2 is a perspective view of the top of a sliding door panel for the box of FIG. 1;

FIG. 3 is a cross-section of the pry-proof junction between the door and the box, taken along line 3—3 of FIG. 1;

Figure 5:
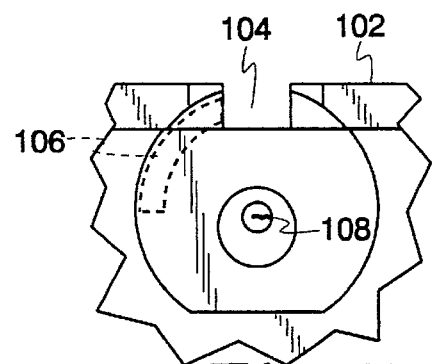
Figure 6:
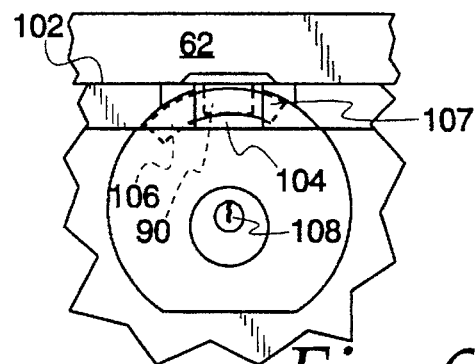
Figure 7:
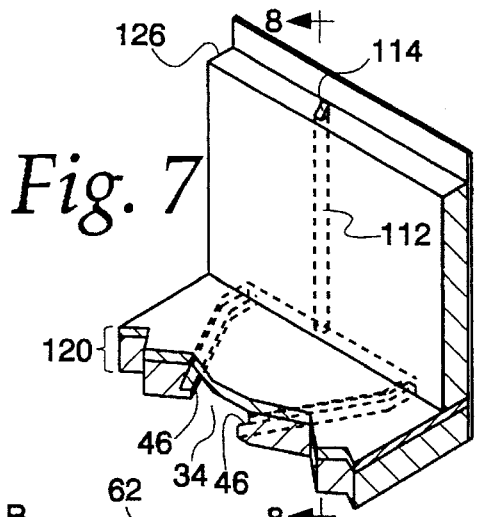
Figure 8:
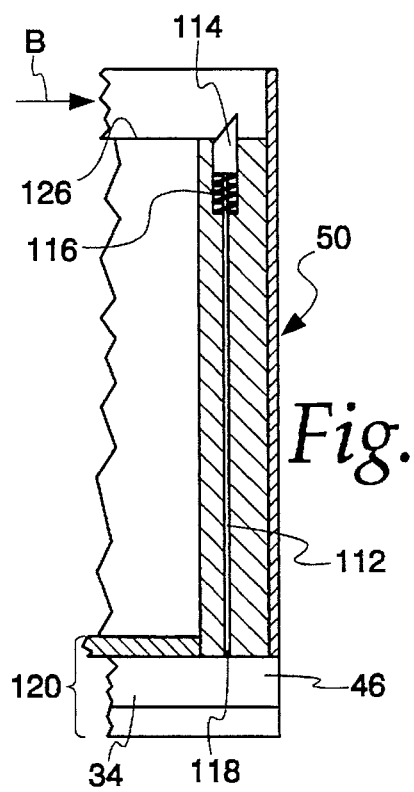
Figure 9:
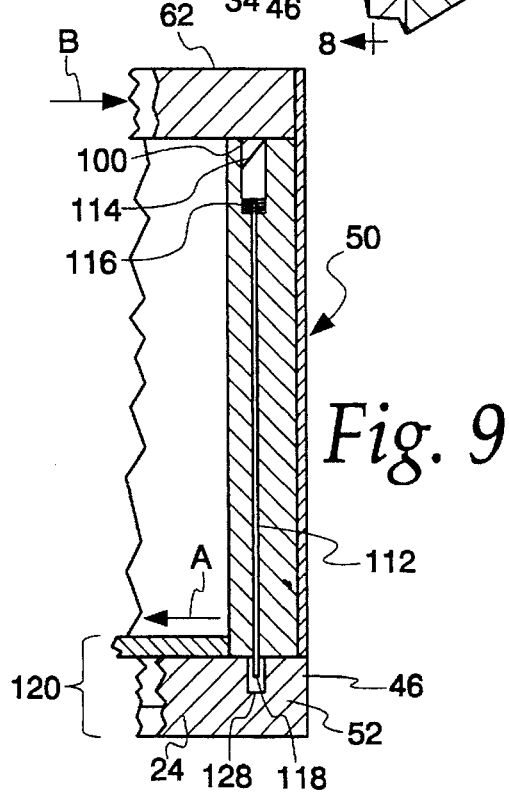

FIG. 5; is a schematic showing of a lock for the door in an unlocked condition;

FIG. 6 is a schematic showing of the lock of FIG. 5 in a locked condition;

FIG. 7 shows a fragment of the back panel of the box with a latch bar enclosed therein for locking to an anchor member;

FIG. 8 is a cross-section taken along line 8—8 of FIG. 7 showing the anchor member latch bar in an unlatched position; and FIG. 9 is similar to FIG. 8, but with the latch bar in a latched position, securing the box to the anchor member.

In FIG. 1, an inventive security box 20 is shown with the sliding door panel removed from the top thereof, giving access to the interior of the box. Any suitable secure structural element is shown at 22. For present purposes, element 22 may be considered a metal panel on the floor of an automobile trunk. However, this secure structural element may also represent such things as the bed of a truck, a floor in a hotel closet, a panel on a secure cabinet in an office, or the like.

A suitable anchor member 24 is attached to the structural element 22 in any suitable manner, as by bolts 26, 28 which fit into counter-sunk recesses 30, 32 on the top surface of the anchor member. Hence, bolt heads 26, 28 do not project above the upper surface of the anchor member 24. In one embodiment, the anchor member 24 was a massive nylon block.

Preferably, the anchor member 24 has a wedge or arrowhead shape adapted to be received in a complimentarily shaped cavity or opening 34 in the bottom of the box. This way the box easily guides itself as the cavity 34 is fitted over the anchor member 24. The vertical sides 36, 38 of the anchor member 24 and vertical sides 40, 42 of the cavity or opening 34 have complementary contours, including upper rails 44 on anchor member sides 36, 38 which are captured in upper grooves 46 of the cavity sides 40, 42. The amount of the relative movement between the box and anchor member is only that required for grooves 46, 46 to slide over side rails 44, 44 since cavity 34 can be set into place over the arrowhead shape in almost its final position. When the side rails are so captured, the box 20 is firmly anchored to the floor or another secure structural element 22.

It should also be noted that, when the wedge or arrowhead anchor member 24 is inserted inside the cavity or opening 34 which is then slid into the capture position, the counter-sunk heads of bolts 26, 28 do not interfere with the upper side 48 of the cavity 34 as it slides into the capture position. Bolts 26, 28 are completely covered by the part of the box which forms the ceiling or upper surface 48 of cavity or opening 34. This is schematically shown in FIG. 1a where the arrowhead shaped anchor member 24 is captured within the complementary arrowhead shaped cavity or opening 34. The relative anchor member-box movement is such that the arrowhead shaped cavity 34 slides in direction A, relative to the anchor member 24. The outside edge 49 of the back panel 50 is well beyond bolts 26, 28 of the anchor member 24. Therefore, bolts 26, 28 are concealed within the cavity or opening 34 and cannot be reached by a would-be thief.

The sliding door panel 62 (FIG. 2) closes the box when slid on tracks 58, 60 to a closed position and gives completely unimpeded access to the interior of the box when the door is removed. In greater detail, at the top of the box, each sidewall panel 54, 56 terminates in a pry-proof track 58, 60 for receiving a sliding panel door 62. The cross-section of the pry-proof track is seen in FIG. 3. First, the door has a thickness which matches the vertical dimension of the track so that there is a smooth and unbroken surface where the two meet at crack 64. The width of the gap at 64 is as small as it can reasonably be made considering the clearance required to prevent binding. Thus, only a very thin pry can be inserted into the crack. Because it is this thin, if the pry is made of a material which a thief is likely to have, it is too weak to pry open the box.

The pry-proof track (FIG. 3) comprises inner and outer upstanding vertical wall surfaces 66, 68. The outer wall surface 68 terminates in a horizontal ledge 70 which defines an offset channel 72 within the wall and under the ledge. The sliding door panel 62 has outboard beads 74, 76 (FIGS. 2, 3) which ride in the offset channels 72 in the sidewalls. A pair of vertical sides 78 on ledge 70 and on door 62 provide a crack depth which is great enough so that even if it can be worked into crack 64, a screwdriver or other likely pry cannot reach down far enough to reach a point where leverage could effectively fulcrum against ledge 70 or door 62. At the front of the door 62, projecting vertical end walls 80, 82 on front panel 96 cover the front edges of the track of FIG. 3 so that no pry can be inserted therein.

Figure 4:
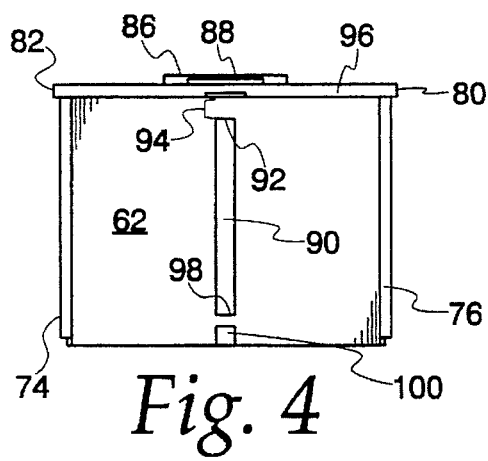
FIG. 4 is a plan view of the bottom of the door for the box of FIG. 1.

Suitable handles (such as 84) are provided on the outside surfaces of sidewalls 54, 56 to facilitate lifting the box 20. The underside of handle 86 on the front of the sliding door panel 62 has a groove 88 (FIG. 4) to facilitate sliding the door 62 on the sidewall tracks 58, 60.

On the bottom or underside (FIG. 4) of door 62, a reinforcing or stiffening strip 90 extends most of the way across the panel to make it more resistant to vandalism. In the front, strip 90 ends at 92, which is some distance 94 away from the front panel 96 on the door. At the back edge of door 62, strip 90 ends at 98 to provide room for a wear-resistant insert 100, such as a strip of nylon, for example.

On the upper front edge 102 of box 20, a notch 104 is formed at a location through which the reinforcing strip 90 passes when the door panel 62 is slid on the side rails 58, 60. The position of an arcuate hasp 106 associated with notch 104 is controlled by a key (not shown) which may be inserted into a keyhole slot 108 in the front of the security box 20 (FIG. 1). When the key is rotated in one direction (FIG. 5), the arcuate hasp 106 is moved out of notch 104, thereby giving the reinforcing strip 90 freedom to slide through the notch. At this time the arcuate hasp 106 is within a passageway concealed in or behind a panel 110 on the inside front wall of the box.

After the sliding door panel 62 is in place closing the top of the box, the key is used to turn the lock 108 (FIG. 6) and thereby rotate the arcuate hasp 106 into position across the notch 104. The arcuate hasp 106 fits into the space 94 (FIG. 4) between the end of reinforcing strip 90 and the front panel 96 on the door 62. The hasp is especially strong since it is curved to form an arch across notch 104 and since the free end 107 of the hasp enters a hole (FIG. 6) in the opposite notch wall and travels far enough through that hole so that both ends of the hasp are securely anchored. In this position, the hasp forms an arch which prevents passage of reinforcing strip 90 through notch 104 so that the door 62 is locked in a closed position and access to the interior of the box is barred.

When the sliding door panel 62 is fully closed, the box 20 cannot be removed from the anchor member 24. In greater detail, a latch bar 112 (FIGS. 7, 8, 9) extends through a vertical bore or hole enclosed within back wall 50 of the box. The upper end of latch bar 112 terminates in a cam surface 114. A coiled bias spring 116 urges the latch bar 112 to a normal upper position where the cam surface 114 of latch bar 112 stands above the upper surface 126 of the inner box wall. In this normal position, the bottom end 118 (FIG. 8) of the latch bar 112 is out of cavity 34 and above the groove 46 in which track 44 of the anchor member 24 slides. Therefore, when the cavity 34 in the bottom wall of box 20 (FIG. 1) is fitted over anchor member 24 and with latch bar 112 in the normal raised position, the box easily slides unimpededly into place (FIG. 1a).

When the door panel 62 is slid (Direction B) into place (FIG. 9) for closing the box, the wear-resistant strip 100 engages the cam surface 114 and forces the spring biased latch bar 112 downwardly and away from its normal position, thereby compressing coil biased spring 116. The bottom end 118 of latch bar 112 passes into cavity 34, across track 46 and into aperture 128 in anchor member 24, which bars and prevents movement of the anchor member 24 within cavity 34 in box 20. Stated another way, with latch bar 112 in a lowered position the relative movement between anchor member 24 and opening 34 cannot be carried out by moving the box in a direction opposite arrow A (FIG. a). Hence, the box 20 cannot be removed from the anchor member 24 when door 62 is closed.

When the sliding door panel 62 is pulled (opposite direction B in FIGS. 8, 9) from the closed position, the wear-resistant strip 100 moves off the cam surface 114 of latch bar 112, bias spring 116 pushes the latch bar 112 upwardly from the lowered position of FIG. 9 to the raised position of FIG. 8. In this raised position, the bottom end 118 of latch bar 112 moves out of aperture 128 of anchor member 24 and track 46. At this time, the anchor member 24 and cavity or opening 34 may have a mutual movement in a direction opposite to direction A so that the box slides away from the anchor member 24.

As soon as the side rails 44 on the anchor member 24 clear the grooves 46, the box 20 may be lifted free of the anchor member. Since the anchor member 24 has an arrowhead shape, this relative movement between the anchor member 24 and the cavity 34 does not have to be very far, just enough for rails 44 to clear groove 46.

The advantages of the invention should now be clear. By simply turning a single key, the safety box 20 is locked in place on an unmovable anchor member bolted to a secure structure. The bolts securing the anchor member 24 are completely enclosed within the cavity or space 34 so that they cannot be removed while the sliding door panel of the box is locked in a closed position. Yet, it is easy to remove the box from the anchor member when the door is unlocked and slid back far enough to clear cam surface 114. All cracks where a pry may be inserted are protected by relatively deep and narrow passageways and by front door panel extensions 80, 82. The arcuate hasp 106 is anchored on both ends to make a mechanically strong device. The latch bar 112 is contained in a vertical bore within the back wall 50 so that it is mechanically reinforced by the box wall and does not occupy any space within the interior of the box. The latching of the box to the anchor member results from closing the door against cam surface 114 and the turning of a single key. There is no need for any manipulation of a separate latching member either upon the installation or on the removal of the box from the anchor member.

Those who are skilled in the art will readily perceive how to modify the invention. Therefore, the appended claims are to be construed to cover all equivalent structures which fall within the true scope and spirit of the invention.

The invention claimed is:

1. A security box system comprising an anchor member adapted to be attached to a secure structure, a security box having a cavity, said anchor member and cavity having complementary contours, said cavity receiving and completely enclosing said anchor member so that said anchor member is captured within the cavity of the box, a door for giving access to or closing the box, and means responsive to closing said door for automatically locking said anchor member within the cavity of said box and responsive to opening said door for automatically unlocking said anchor member from the cavity of said box.

2. The system of claim 1 and locking means for locking said door on said box when said door is closed.

3. The system of claim 2 wherein said complementary contours of said anchor member and said cavity are somewhat arrowhead shaped with a track on one of said anchor member and cavity, and with a mating groove on the other of said anchor member and said cavity, so that said anchor member is captured within said cavity responsive to a relative movement between said anchor member and box over a distance required for said track and groove to engage each other.

4. The system of claim 2 wherein said door is a sliding panel with pry-proof cracks between said door and said box, and each of said cracks comprises an outboard bead and an offset channel wherein said bead fits into and rides in said offset channel, one of said bead and channel being on said door and the other of said bead and channel being on a corresponding edge of said box.

5. The system of claim 4 wherein said outboard bead is on said door and said offset channel is on said box, said offset channel being covered by a ledge on said edge of said box, said ledge having dimensions which prevent a pry from being inserted between said bead and offset channel.

6. The system of claim 2 wherein a wall of said box contains a bore with a sliding latch bar therein, said latch bar having two ends, one of said ends extending from a cam surface engaged by said door and the other of said ends extending to said cavity, means responsive to an opening and closing of said door for disengaging or engaging said cam surface to move said latch bar, said latch bar having a length which causes it to enter into said cavity to prevent said anchor member from escaping from said cavity responsive to a closing of said door and the resulting movement of said cam.

7. The system of claim 6 and means for urging said sliding latch bar to a raised position when said door is open, the length of said latch bar causing it to leave said cavity when said latch bar is in said raised position, whereby said box is automatically captured by and released from said anchor member responsive to opening and closing said door.

8. The system of claim 6 and a wear-resistant surface on a portion of said door which engages said cam surface for pushing said bar latch.

9. The system of claim 2 wherein said door is a sliding panel with a reinforcing and stiffening strip attached to and depending from an underside thereof, said means for locking said door comprises a notch in an edge of said box at a location through which said strip passes as said door slides, an arcuate hasp which rotates into and out of said notch in order to position said hasp to interfere or not to interfere, respectively, with movement of said strip as said door slides.

10. The system of claim 9 further comprising a hole on each of opposite sides of said notch at locations where said rotation of said arcuate hasp into said notch causes said hasp to be in a position spanning said notch with opposite ends of said hasp located in and supported by said holes, whereby said hasp forms an arch barring said strip from sliding through said notch.

11. A security box having six sides, a top one of said six sides being a sliding door panel for opening and closing said box, side wall tracks extending between a front and a back of said box on upper edges of two opposing ones of said six sides, said door panel sliding in said tracks, said tracks being formed by outboard beads on said sliding door panel and offset channels in said upper edges of said sidewall, a cavity in a bottom of said box, an anchor means adapted to be attached to a stationary structure, said cavity and said anchor means having complementary contours which cause said anchor means to be captured in and released from said cavity responsive to a relative movement between said cavity and said anchor means, a cam surface located to be engaged by said sliding door panel when said door reaches a box closed position, means enclosed within a wall of said box for securing said capture of said anchor means in said cavity responsive to a closure of said door acting upon said cam surface and for releasing said capture of said anchor means responsive to an opening of said door acting upon said cam surface, and means responsive to a single key for locking said door in said closed position, thereby securing of the capture of said anchor means in said cavity.

12. The box of claim 11 wherein said anchor means and said cavity have somewhat arrowhead shapes with complementary contours for causing said capture, and said means enclosed within said wall of said box is a spring biased latch bar extending from said cam surface to said cavity, said spring bias normally moving said latch bar out of said cavity when said door is open and said cam surface forcing said latch bar against said spring bias and into said cavity when said door is closed.

13. The box of claim 12 wherein said locking means includes a notch and a hasp which clears said notch in one position and spans said notch in another position, said hasp being anchored on both sides of said notch when in said other position, and means on said sliding door panel which must move through said notch to enable said door to slide, whereby before said door may open said hasp must move from said other position to said one position, thereby clearing said notch.

14. The box of claim 13 wherein said means which must move through said notch is a reinforcing strip extending across and attached to an underside of said sliding door panel.

15. A safety box for use in an automotive vehicle, said box comprising a somewhat arrowhead shaped anchor means adapted to be attached by at least one bolt to a floor of said vehicle, said bolt being counter-sunk in said anchor means whereby a head of said bolt is below an upper surface of said anchor means, a box having a cavity on a lower surface thereof, said anchor means and said cavity having complementary contours whereby said anchor means fits into said cavity, at least a rail and a groove forming at least part of said complementary contours for capturing or releasing said box responsive to a sliding motion, a spring biased latch bar slidingly enclosed within a bore in a wall of said box and normally biased to a first position where said latch bar is clear of said cavity, said bar extending from a cam surface near a top edge of said box for forcing said latch bar against said spring bias and into a second position, said latch bar entering said cavity when in said second position for locking said anchor means within said cavity, and means for operating said cam in response to closing of a door on said box.

16. The box of claim 15 and means on said box for locking and unlocking said door whereby said locking and unlocking of said door also controls said locking and release of said anchor means in said cavity.

* * * * *